(12) United States Patent
Styles et al.

(10) Patent No.: US 9,459,028 B2
(45) Date of Patent: Oct. 4, 2016

(54) VEHICLE HEAT PUMP SYSTEM AND METHOD UTILIZING INTERMEDIATE GAS RECOMPRESSION

(71) Applicant: GM GLOBAL TECHNOLOGY OPERATIONS LLC, Detroit, MI (US)

(72) Inventors: Bryan M. Styles, South Lyon, MI (US); Mark D. Nemesh, Troy, MI (US); Harry E. Eustice, Troy, MI (US); Mukund S. Wankhede, Fort Gratiot, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 680 days.

(21) Appl. No.: 13/750,426

(22) Filed: Jan. 25, 2013

(65) Prior Publication Data

US 2014/0208775 A1     Jul. 31, 2014

(51) Int. Cl.
| | |
|---|---|
| *F25B 30/02* | (2006.01) |
| *F25B 5/02* | (2006.01) |
| *F25B 6/02* | (2006.01) |
| *F25B 29/00* | (2006.01) |
| *B60H 1/00* | (2006.01) |

(52) U.S. Cl.
CPC ............ *F25B 30/02* (2013.01); *B60H 1/00278* (2013.01); *B60H 1/00921* (2013.01); *F25B 5/02* (2013.01); *F25B 6/02* (2013.01); *F25B 29/003* (2013.01); *B60H 2001/00949* (2013.01); *F25B 2400/0403* (2013.01); *F25B 2400/13* (2013.01)

(58) Field of Classification Search
CPC ........ F25B 30/02; F25B 5/02; F25B 29/003; F25B 6/02; F25B 2400/0403; F25B 2400/13; B60H 1/00921; B60H 1/00278; B60H 2001/00949; Y02T 10/7005

USPC .............................................. 62/324.6, 238.6
See application file for complete search history.

(56) References Cited

U.S. PATENT DOCUMENTS 5,174,123 A * 12/1992 Erickson ................. F25B 1/047
                                                                           62/113
6,047,770 A * 4/2000 Suzuki ............... B60H 1/00007
                                                                           165/202

(Continued)

FOREIGN PATENT DOCUMENTS

| CN | 101706171 A | 5/2010 |
|---|---|---|
| CN | 101776342 A | 7/2010 |

(Continued)

*Primary Examiner* — Len Tran
*Assistant Examiner* — Kirstin Oswald
(74) *Attorney, Agent, or Firm* — Quinn Law Group, PLLC (57) ABSTRACT

A vehicular heat pump system utilizing intermediate gas recompression is provided. The heat pump system is for use in a vehicle having a battery and a passenger compartment. The heat pump system may include a heating circuit and a cooling circuit each including a compressor having a first inlet and a second inlet and a vapor-liquid separator configured to separate intermediate pressure refrigerant supplied by a first expansion device into refrigerant in a gaseous state flowing therethrough and refrigerant in a liquid state flowing therethrough. The vapor-liquid separator may be configured to selectively inject refrigerant in a gaseous state into the compressor at the second inlet to increase the mass flow rate of the refrigerant. This allows the heat pump system to operate effectively in cold ambient temperatures. A method of operating a heat pump system utilizing intermediate gas recompression is also provided.

12 Claims, 4 Drawing Sheets

(56) References Cited

U.S. PATENT DOCUMENTS

| | | | |
|---|---|---|---|
| 6,237,351 B1* | 5/2001 | Itoh | B60H 1/00921 62/113 |
| 7,940,028 B1* | 5/2011 | Hermann | H01M 16/006 320/104 |
| 2001/0020529 A1* | 9/2001 | Karl | B60H 1/00007 165/202 |
| 2005/0039878 A1* | 2/2005 | Meyer | B60H 1/00878 165/42 |
| 2010/0012295 A1* | 1/2010 | Nemesh | B60H 1/00278 165/104.19 |
| 2010/0212338 A1* | 8/2010 | Hermann | B60H 1/00278 62/118 |
| 2011/0174000 A1* | 7/2011 | Richter | B60H 1/00064 62/93 |

FOREIGN PATENT DOCUMENTS

| | | |
|---|---|---|
| CN | 101957061 A | 1/2011 |
| CN | 102322707 A | 1/2012 |
| CN | 102635977 A | 8/2012 |
| CN | 102798214 A | 11/2012 |
| DE | 10123830 A1 | 11/2002 |
| JP | 2007178042 A | 7/2007 |
| JP | 2011152827 A | 8/2011 |
| JP | 2012236577 A | 12/2012 |

\* cited by examiner

VEHICLE HEAT PUMP SYSTEM AND METHOD UTILIZING INTERMEDIATE GAS RECOMPRESSION

TECHNICAL FIELD

The disclosure relates to a vehicle heat pump system utilizing intermediate gas recompression, which allows the system to operate effectively in cold ambient temperatures.

BACKGROUND

Hybrid electric vehicles selectively use an internal combustion engine as a source of input torque to a transmission, alone or in conjunction with the traction motor(s), while extended-range electric vehicles use a smaller engine only when needed, and solely to power an electric generator. Battery electric vehicles forego use of the small gas engine, and instead operate using stored electrical energy or regenerative braking energy. All three vehicle configurations can operate solely on electricity in what is referred to as an electric vehicle (EV) mode.

In some of the above vehicle embodiments, a Rechargeable Energy Storage System (RESS) is used to alternatively store and deliver the substantial amounts of electrical energy needed for driving the fraction motor(s). The RESS may consist of a battery pack having multiple battery modules each containing multiple cylindrical or flat/tabular battery cells. The battery pack generates heat in operation. Effectively dissipating the generated heat is essential to optimizing vehicle performance. As a result, thermal management systems are used in conjunction with battery packs to circulate a volume of a suitable cooling fluid through 1) the battery pack and any associated power electronics; and 2) an active heating circuit and cooling circuit to control the temperature of the passenger compartment.

In some thermal management systems, the system may operate in two operating modes, namely heating mode and cooling mode, either independently or simultaneously. During heating mode, the system employs a heat pump condenser, inside the HVAC module or within the vehicle underhood, and the RESS chiller as the heat pump evaporator. Additionally, the heating circuit may include a cabin evaporator, which may be configured to cool and dehumidify air transmitted to the passenger compartment. In cooling mode, the system utilizes an independent AC condenser outside the HVAC module, and a cabin evaporator.

In such systems, it is not necessary to require the reversal of refrigerant flow when changing operating modes. Absent the requirement to reverse the system, the position of the low-pressure side of the system, defined between one of the plurality of expansion devices and the compressor, remains constant in all operating modes reducing or eliminating the need to de-ice an outside heat exchanger in heating mode, and allowing uninterrupted heating of the passenger compartment. However, these base systems are designed to effectively operate in EV mode in mild ambient temperatures.

SUMMARY

A vehicular heat pump system utilizing intermediate gas recompression is provided. The heat pump system is for use in a vehicle having a battery and a passenger compartment. The heat pump system includes a heating circuit and a cooling circuit. The heating circuit is configured to circulate refrigerant throughout the heat pump system when the passenger compartment is in need of heating. The cooling circuit is configured to circulate refrigerant throughout the heat pump system when the passenger compartment is in need of cooling. The heat pump system may optionally include, in addition to the refrigerant loop, a coolant loop configured to circulate coolant and heat the passenger compartment utilizing a first condenser and a coolant heater core.

The heating circuit and cooling circuit each include a compressor having a first inlet and a second inlet, configured to compress the refrigerant flowing through one of the heating circuit and cooling circuit. The heating circuit and cooling circuit may each further include a vapor-liquid separator configured to separate intermediate pressure refrigerant supplied by a first expansion device into refrigerant in a gaseous state flowing therethrough and refrigerant in a liquid state flowing therethrough.

The vapor-liquid separator is configured to selectively inject refrigerant in a gaseous state into the compressor at the second inlet to increase the mass flow rate of the refrigerant, and accordingly increase the pressure of the refrigerant flowing through the compressor. This allows the system to operate effectively in cold ambient temperatures.

A method of operating a heat pump system is also provided. The method comprising the steps of: supplying intermediate pressure refrigerant to a vapor-liquid separator with one of a first flow control valve and a first expansion device; separating the intermediate pressure refrigerant into gaseous refrigerant and liquid refrigerant with a vapor-liquid separator; evaluating the pressure of the refrigerant within a compressor with a controller; and injecting gaseous refrigerant from the vapor-liquid separator into a compressor to increase the mass flow rate of refrigerant entering the compressor when the refrigerant pressure entering the compressor reaches a minimum threshold value.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

The following description and figures refer to example embodiments and are merely illustrative in nature and not intended to limit the invention, its application, or uses. Throughout the figures, some components are illustrated with standardized or basic symbols. These symbols are representative and illustrative only, and are in no way limiting to any specific configuration shown, to combinations between the different configurations shown, or to the claims. All descriptions of componentry are open-ended and any examples of components are non-exhaustive.

Referring to the figures, wherein like reference numbers correspond to like or similar components throughout the several views, a heat pump system 100, 200 for use in a vehicle having a passenger compartment 122 and a battery 115 is provided. The heat pump system 100 is configured to control the temperature of the passenger compartment 122 and the battery 115. The heat pump system 100, 200 may utilize intermediate gas recompression to increase the mass flow rate of a refrigerant circulated therethrough to allow the system to operate in cold ambient temperatures. The heat pump system 100, 200 is described herein and shown in FIGS. 1-4 with respect to a variety of configurations and operating modes.

The heat pump system 100, 200 may operate in one of two modes: a cooling mode and a heating mode. The heat pump system 100,200 may also operate in both cooling mode and heating mode simultaneously. When operating in each of the respective heating mode and cooling mode, the heat pump system 100, 200 circulates a refrigerant, through a refrigerant loop 167. The refrigerant may be one of R-134a, R-1234yf, R-744, R-152a or the like. In heating mode, the refrigerant may be directed through a plurality of components along the heating circuit 125 to heat and dehumidify a vehicle passenger compartment 122 and/or to cool a vehicle battery 115. In cooling mode the refrigerant may be directed through a plurality of components along the cooling circuit 124 to cool and dehumidify the vehicle passenger compartment 122 and/or cool the vehicle battery 115.

Figure 1:
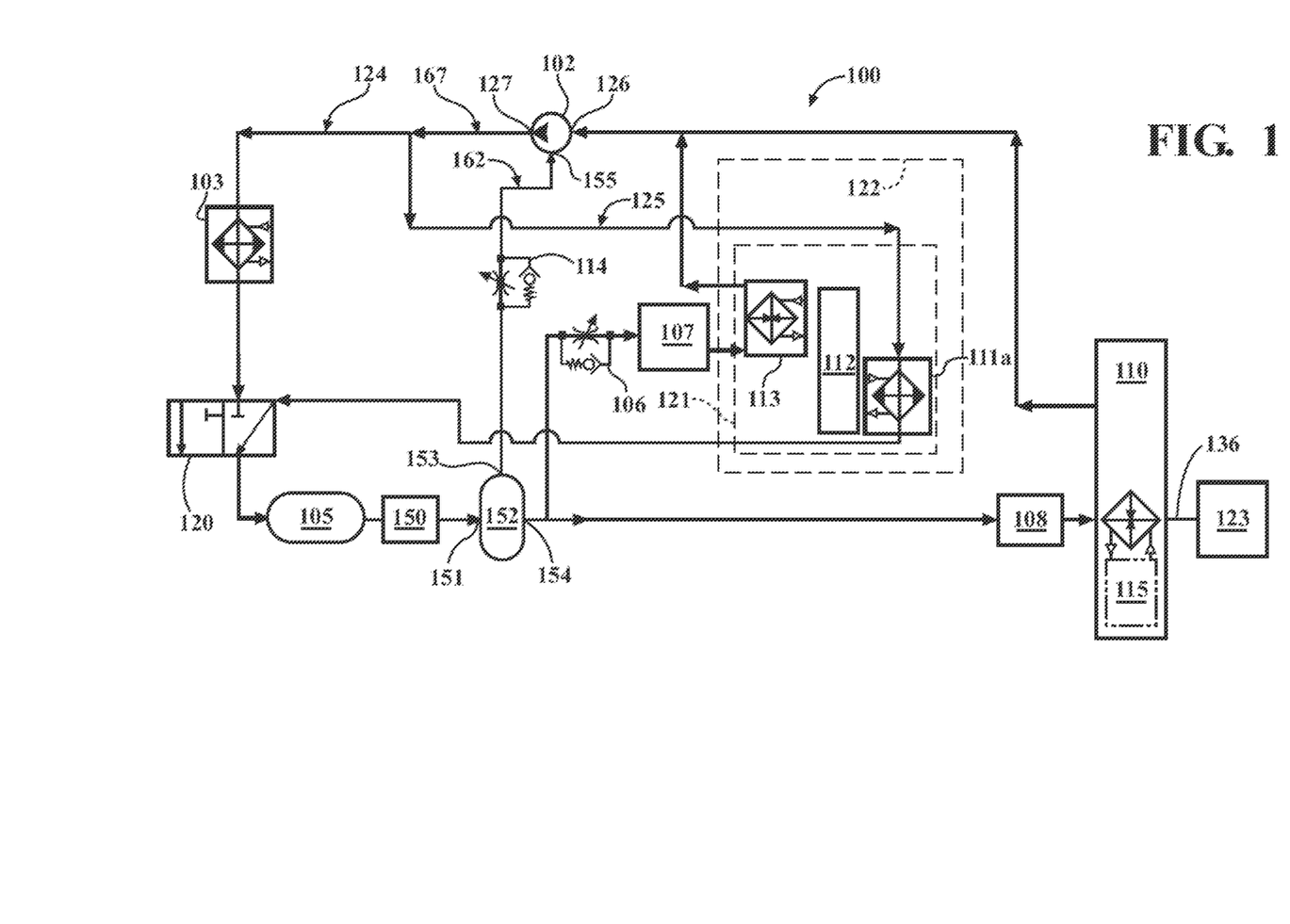
FIG. 1 is a schematic diagram of first configuration of a first embodiment of the vehicular heat pump system.

Referring to FIG. 1, the refrigerant loop 167 of the heat pump system 100 may have a heating circuit 125, which circulates refrigerant in heating mode, and a cooling circuit 124, which circulates refrigerant in cooling mode.

The heating circuit 125 may be configured to circulate refrigerant throughout the heat pump system 100 in heating mode in order to heat the passenger compartment 122 and cool the battery 115. The cooling circuit 124 may be configured to circulate refrigerant throughout the heat pump system 100 to cool and dehumidify the passenger compartment 122 and to cool the vehicle battery 115.

The heating circuit 125 may independently include a compressor 102, a first condenser 111a. The cooling circuit may independently include the compressor 102 and a second condenser 103. Each of the heating circuit 125 and cooling circuit 124 may further include: a first flow control valve 120; a receiver dryer 105; a first expansion device 150; a vapor-liquid separator 152; a second expansion device 108; a third expansion device 107; an RESS chiller 110; a cabin evaporator 113; and at least one control module 123.

The compressor 102 may be driven by an electric motor (not shown), which may be of the single or variable speed variety. The compressor 102 may also be a pump driven by a belt connected to the engine crankshaft (not shown). The compressor 102 may have a first inlet 126, a second inlet 155, and an outlet 127 and may be configured to receive refrigerant gas at each of the first inlet 126 and second inlet 155. The compressor 102 pressurizes the refrigerant gas into a high-pressure state. The compressor 102 is further configured to expel compressed refrigerant gas at the outlet 127 to the first condenser 111a along the heating circuit 125 during heating mode and to the second condenser 103 along the cooling circuit 124 in cooling mode.

Figure 2:
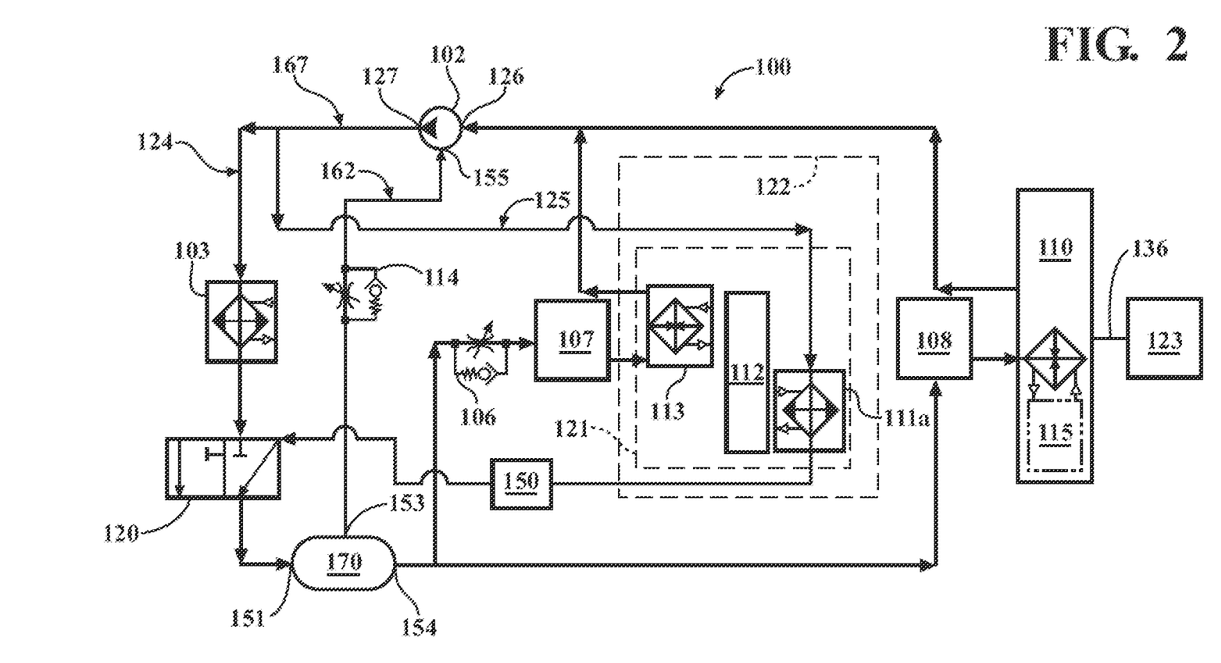
FIG. 2 is a schematic diagram of a second configuration of the first embodiment of the vehicular heat pump system.
Figure 3:
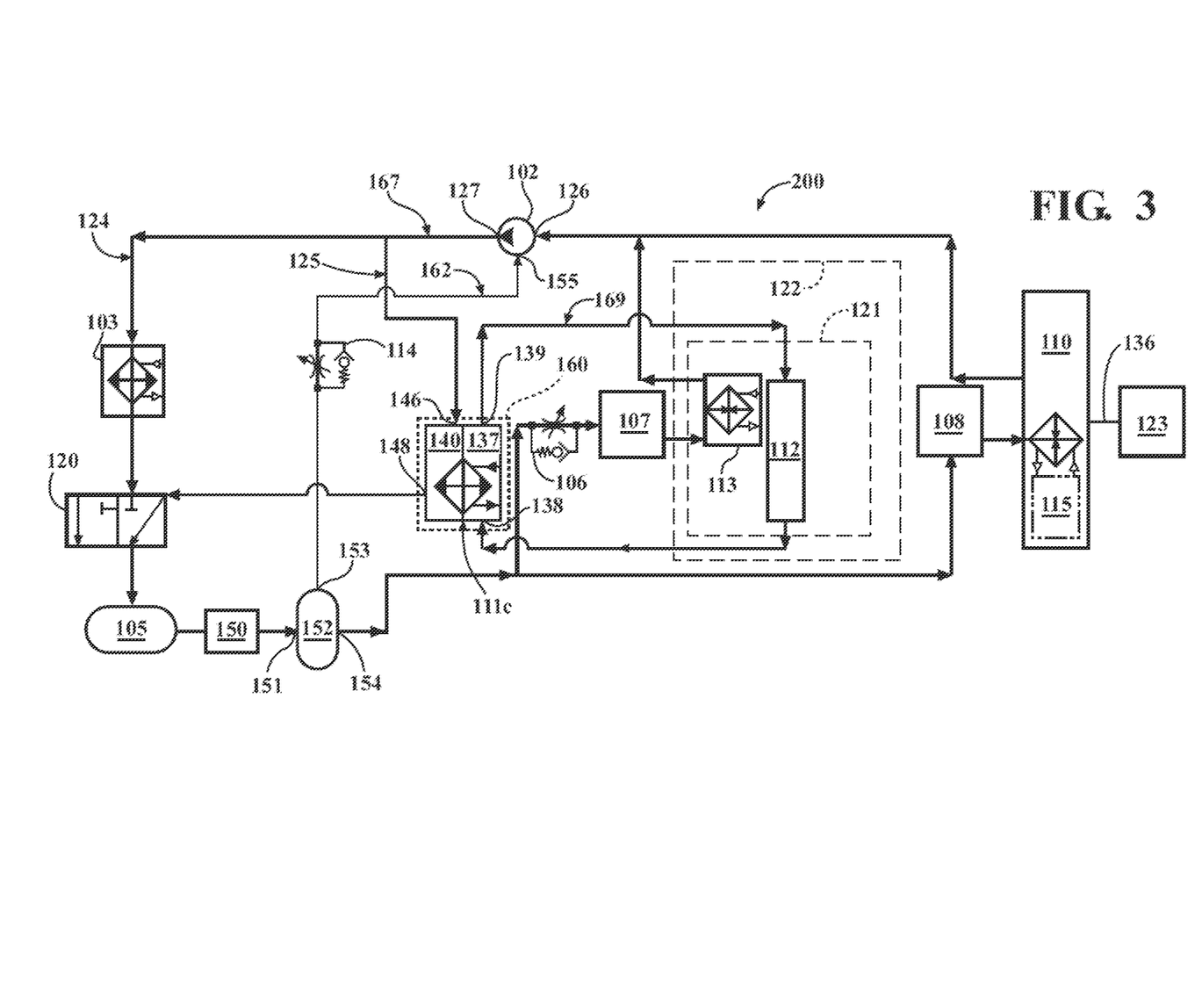
FIG. 3 is a schematic diagram of a first configuration of a second embodiment of the vehicular heat pump system.
Figure 4:
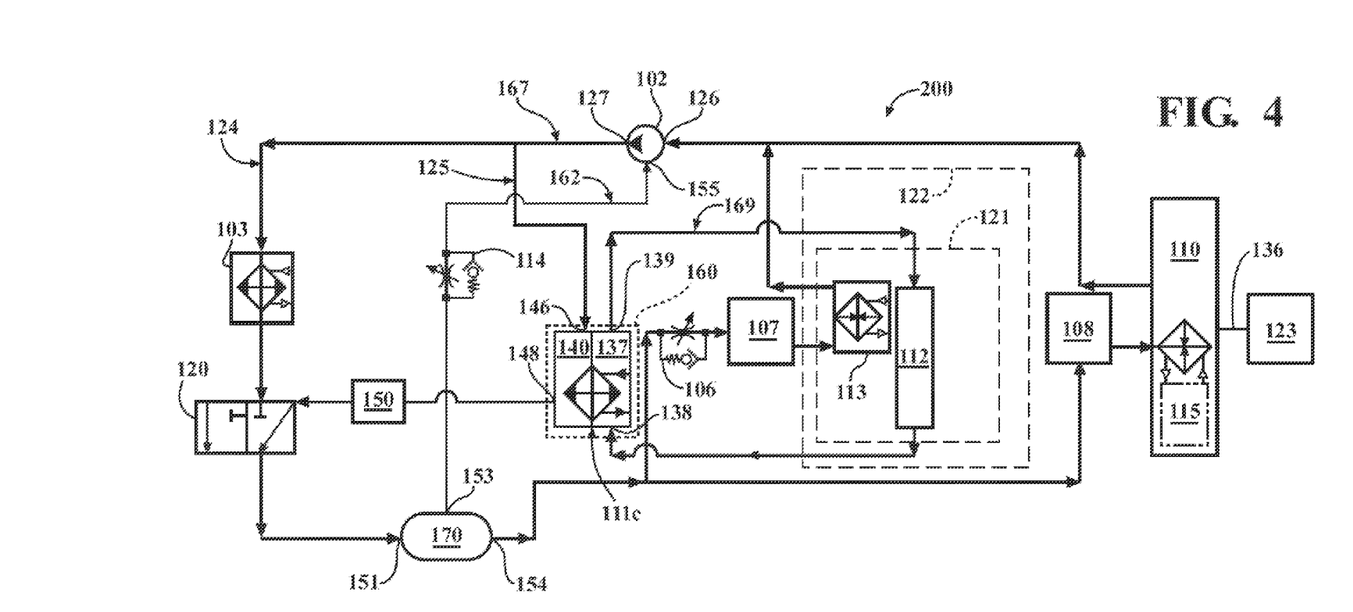
FIG. 4 is a schematic diagram of a second configuration of the second embodiment of the vehicular heat pump system.

The heating circuit 125 may further include a first condenser 111a configured to receive refrigerant from the compressor 102 and further configured to cool and condense the refrigerant. As shown in FIGS. 1 and 2, the first condenser 111a may be a refrigerant-to-air heat pump condenser located within the HVAC module 121. The first condenser 111a may be configured to exchange heat between the refrigerant flowing through the first condenser 111a and air flowing across the first condenser 111a to heat the passenger compartment 122. The first condenser may also be a refrigerant-to-coolant heat exchanger 111c located in the vehicle underhood 160, as shown in FIGS. 3 and 4 and described herein below. The first condenser 111a may be configured to expel cooled liquid refrigerant to a first flow control valve 120.

The cooling circuit 124 may further include a second condenser 103 configured to receive refrigerant from the compressor 102 and further configured to cool and condense pressurized refrigerant gas as it flows through the second condenser 103, to the extent that the pressurized refrigerant gas is cooled and condensed to a point at which it is reclaimed into a liquid state. The second condenser 103 may be a refrigerant-to-air heat exchanger and may be configured to exchange heat between the refrigerant flowing through the second condenser 103 and the ambient air. The second condenser 103 may be configured to expel cooled liquid refrigerant to a first flow control valve 120.

The first flow control valve 120 may be a three-way two-position valve. The first flow control valve 120 may be configured to occupy a first position in heating mode in which the first control valve 120 receives refrigerant from the first condenser 111a and blocks flow from the second condenser 103. The first flow control valve 120 may be configured to occupy a second position in cooling mode in which the first control valve 120 receives refrigerant from the second condenser 103 and blocks flow from the first condenser 111a. The first flow control valve 120 may be further configured to expel refrigerant to the receiver dryer 105 when occupying one of the first position and second position.

The receiver dryer 105 may be configured to receive high-pressure liquid refrigerant from the first flow control valve 120. The receiver dryer 105 may include a plurality of desiccants (not shown) to attract and remove moisture from the refrigerant. The receiver dryer 105 may be further configured to expel the high pressure refrigerant liquid to a first expansion device 150.

The first expansion device 150 may allow the high pressure liquid refrigerant to cool and expand, reducing the pressure of the refrigerant as it exits the first expansion device 150. The first expansion device 150 may be further configured to control and selectively distribute intermediate pressure refrigerant to a vapor-liquid separator 152 through a vapor-liquid separator inlet 151. The intermediate pressure refrigerant may be composed of refrigerant in a liquid state and refrigerant in a gaseous state.

The vapor-liquid separator 152 may have an inlet 151, a first outlet 153, and a second outlet 154. The vapor-liquid separator 152 may be an accumulator or the like. The vapor-liquid separator 152 may also be combined into one structure with the receiver dryer 105 as described herein with respect to FIG. 2. The vapor-liquid separator 152 is configured to separate intermediate pressure refrigerant received from the first expansion device 150 into gaseous refrigerant and liquid refrigerant.

The vapor-liquid separator 152 is further configured to transmit gaseous refrigerant from the first outlet 153. The vapor-liquid separator 152 may be further configured to inject gaseous refrigerant though a gas injection line 162 and into the compressor 102 at the second inlet 155. As the ambient temperature decreases, the mass flow rate of refrigerant into the compressor 102 correspondingly decreases and lowers the heating capacity of the heat pump system 100. By injecting refrigerant gas into the compressor 102 at the second inlet 155 the flow rate therethrough is combined with the mass flow rate of refrigerant suctioned into the compressor 102 at the first inlet 126, allowing the pressure of the refrigerant within the compressor 102 to increase and the system 100 to operate in ambient temperatures as low as about −20° C. Further, the injection of refrigerant gas into the compressor 102 may be controlled by a second flow control valve 114 along the gas injection line 162, which may be fully closed or fully open depending on the need to increase the mass flow rate through the compressor.

The vapor-liquid separator 152 may also expel liquid refrigerant through the second outlet 154. The liquid refrigerant may be selectively distributed in both the heating circuit 125 and cooling circuit 124 from the vapor-liquid separator to one or both of a second expansion device 108 and a third expansion device 107 via a third control valve 106.

If dehumidification of the passenger compartment is not needed, all of the liquid refrigerant will be selectively distributed to the second expansion device 108 and the third control valve 106 will be fully closed.

The second expansion device 108 may allow the high pressure liquid refrigerant to expand, reducing the pressure in the system 100. The second expansion device 108 may direct and selectively distribute refrigerant to the RESS chiller 110, at a significantly reduced pressure. The second expansion device 108 may be a thermostatic or thermal expansion valve, and may be configured to hold a constant evaporator superheat state as the refrigerant enters RESS chiller 110, which acts as an evaporator. The second expansion device 108 may monitor, such as with a sensor or a bulb, the temperature of the refrigerant leaving the RESS chiller 110, and may improve the performance of the heat exchange by letting additional or less refrigerant into the RESS chiller 110.

The RESS chiller 110 may be located outside the HVAC module 121. The RESS chiller 110 may function as a heat pump evaporator that may include coils (not shown) or the like to dissipate heat from the battery 115 to the cooled refrigerant. The RESS chiller 110 may direct refrigerant back to the compressor 102.

If dehumidification of the passenger compartment 122 is needed, the third flow control valve 106 may be partially or fully open allowing some or all of the refrigerant expelled from the vapor-liquid separator 152 to be distributed to a third expansion device 107. The third expansion device 107 may direct and selectively distribute refrigerant to the cabin evaporator 113, at a significantly reduced pressure. The third expansion device 107 may be a thermostatic or thermal expansion valve, and may be configured to hold a constant evaporator superheat state as the refrigerant enters the cabin evaporator. The third expansion device 107 may monitor, such as with a sensor or a bulb, the temperature of the refrigerant leaving the cabin evaporator 113, and may improve the performance of the heat exchange by letting additional or less refrigerant into the cabin evaporator 113.

The cabin evaporator 113 may be located within the HVAC module 121. The cabin evaporator 113 may include coils (not shown). The cabin evaporator 113 may be configured to cool and dehumidify the air flowing across the coils (not shown) and into the passenger compartment 122. The cabin evaporator 113 may further include a fan (not shown) to direct air over the coils impregnated with refrigerant, and facilitate the direction of the air into the passenger compartment 122. The cabin evaporator 113 may be further configured to direct refrigerant back to the compressor 102.

Referring to FIG. 2, a second configuration of the first embodiment of the heat pump system 100 is shown. In the second configuration the heating circuit and cooling circuit remain the same with the exception that the first expansion device 150 is relocated upstream of the first flow control valve 120. Further, the receiver dryer 105 and the vapor-liquid separator 152 (as shown in FIGS. 1 and 3) are combined into a combination receiver dryer vapor-liquid separator component 170 (as shown in FIGS. 2 and 4) capable of both removing moisture from the refrigerant and separating intermediate pressure refrigerant received from the first expansion device 150 into gaseous refrigerant and liquid refrigerant.

Therefore, the first expansion device 150, as shown in FIG. 2, may allow the high pressure liquid refrigerant to cool and expand, reducing the pressure of the refrigerant as it exits the first expansion device 150. The first expansion device 150 may be further configured to control and selectively distribute intermediate pressure refrigerant to the first flow control valve 120. The intermediate pressure refrigerant may be composed of refrigerant in a liquid state and refrigerant in a gaseous state.

The first flow control valve 120 may be a three-way two-position valve. The first flow control valve 120 may be configured to occupy a first position in heating mode in which the first control valve 120 receives refrigerant from the first condenser 111a and blocks flow from the second condenser 103. The first flow control valve 120 may be configured to occupy a second position in cooling mode in which the first control valve 120 receives refrigerant from the second condenser 103 and blocks flow from the first condenser 111a. The first flow control valve 120 may be further configured to expel refrigerant to the combination receiver dryer vapor-liquid separator component 170 when occupying one of the first position and second position.

The combination receiver dryer and vapor-liquid separator 170, as shown in FIG. 2, may have an inlet 151, a first outlet 153, and a second outlet 154. The combination receiver dryer and vapor-liquid separator 170 may be configured to remove moisture from the refrigerant and separate intermediate pressure refrigerant received from the first expansion device 150 into gaseous refrigerant and liquid refrigerant.

The combination receiver dryer and vapor-liquid separator 170 may expel gaseous refrigerant from the first outlet 153 and be further configured to inject gaseous refrigerant though a gas injection line 162 and into the compressor 102 at the second inlet 155.

The combination receiver dryer and vapor-liquid separator 170 may also expel liquid refrigerant through the second outlet 154. The liquid refrigerant may be selectively distributed in both the heating circuit 125 and cooling circuit 124 from the combination receiver dryer and vapor-liquid separator 170 to one or both of a second expansion device 108 and a third expansion device 107 via a third control valve 106.

Referring to FIG. 3, a first configuration of the second embodiment of the heat pump system 200 is shown. The cooling circuit 124 within the refrigerant loop 167 of the second embodiment of the heat pump system 200 is equivalent to that of the system described with respect to FIG. 1 and FIG. 2.

The heating circuit 125 of the refrigerant loop 167 of the second example embodiment of the heat pump system 200 may contain substantially the same structure as described with respect to the first embodiment described above with regard to FIG. 1 and FIG. 2. However, the heating circuit 125 will consist of a coolant loop 169 in addition to the refrigerant loop 167. Additionally, the first condenser 111c may be a refrigerant-to-coolant heat exchanger rather than a refrigerant-to-air heat exchanger 111a. Further, in the second example embodiment, the first condenser 111c may be located in the vehicle underhood 160, rather than within the HVAC module 121.

The first condenser 111c may include a refrigerant cavity 140 and a coolant cavity 137. The refrigerant cavity 140 may include a refrigerant inlet 146 and a refrigerant outlet 148, allowing refrigerant within the refrigerant loop 167 to pass therethrough. The coolant cavity 137 may include a coolant inlet 138 and a coolant outlet 139, allowing the coolant within the coolant loop 169 to pass therethrough.

The refrigerant loop 167 within the heating circuit 125, of the second example embodiment, may include the compressor 102, the refrigerant cavity 140 of the first condenser 111c, the first flow control valve 120, the receiver dryer 105, the first expansion device 150, and the vapor-liquid separator 152.

The first condenser 111c may be configured to receive pressurized refrigerant gas at the refrigerant inlet 146, and may extract heat from the pressurized gas as it flows through the refrigerant cavity 140 to the extent that the pressurized refrigerant gas is cooled and condensed to a point at which it is reclaimed into a liquid state. The heat extracted from the refrigerant as it flows through the refrigerant cavity 140 may be transferred to the coolant circulating within the coolant loop 169 within the heating circuit 125.

The refrigerant loop 167 may circulate refrigerant from the outlet of the refrigerant cavity 140 to the first flow control valve 120. The first flow control valve 120 may be configured to occupy the first position in heating mode in which the first control valve 120 receives refrigerant from the first condenser 111c and blocks flow from the second condenser 103. The refrigerant loop 167 may circulate refrigerant from the first flow control valve 120 to the receiver dryer 105, which may attract and remove moisture from the refrigerant.

The refrigerant loop 167 may circulate refrigerant from the receiver dryer 105 to the first expansion device 150, which may be configured to allow the refrigerant to cool and expand. The first expansion device 150 may expel intermediate pressure refrigerant to the vapor-liquid separator 152.

The vapor-liquid separator 152 may be configured to separate intermediate pressure refrigerant received from the first expansion device 150 into gaseous refrigerant and liquid refrigerant. The vapor-liquid separator 152 may expel gaseous refrigerant from the first outlet 153. The vapor-liquid separator 152 may be further configured to inject gaseous refrigerant though a gas injection line 162 and into the compressor 102 at the second inlet 155. The injection of refrigerant gas into the compressor 102 may be controlled by a second flow control valve 114 along the gas injection line 162, which may be fully closed or fully open depending on the need to increase the mass flow rate of the refrigerant flowing through the compressor 102.

The vapor-liquid separator 152 may also expel liquid refrigerant through the second outlet 154. The liquid refrigerant may be selectively distributed from the vapor-liquid separator 152 to one or both of a second expansion device 108 and a third expansion device 107 via a third control valve 106.

If dehumidification of the passenger compartment is not needed, all of the liquid refrigerant will be selectively distributed to the second expansion device 108 and the third control valve 106 will be fully closed.

The second expansion device 108 may allow the high pressure liquid refrigerant to expand, reducing the pressure in the system 200. The second expansion device 108 may direct and selectively distribute refrigerant to the RESS chiller 110, at a significantly reduced pressure. The second expansion device 108 may be a thermostatic or thermal expansion valve, and may be configured to hold a constant evaporator superheat state as the refrigerant enters RESS chiller 110, which acts as an evaporator. The second expansion device 108 may monitor, such as with a sensor or a bulb, the temperature of the refrigerant leaving the RESS chiller 110, and may improve the performance of the heat exchange by letting additional or less refrigerant into the RESS chiller 110.

The RESS chiller 110 may be located outside the HVAC module 121. The RESS chiller 110 may function as a heat pump evaporator that may include coils (not shown) or the like to dissipate heat from the battery 115 to the cooled refrigerant. The RESS chiller 110 may direct refrigerant back to the compressor 102.

If dehumidification of the passenger compartment 122 is needed, the third flow control valve 106 may be partially or fully open allowing some or all of the refrigerant expelled from the vapor-liquid separator 152 to be distributed to a third expansion device 107. The third expansion device 107 may direct and selectively distribute refrigerant to the cabin evaporator 113, at a significantly reduced pressure. The third expansion device 107 may be a thermostatic or thermal expansion valve, and may be configured to hold a constant evaporator superheat state as the refrigerant enters the cabin evaporator. The third expansion device 107 may monitor, such as with a sensor or a bulb, the temperature of the refrigerant leaving the cabin evaporator 113, and may improve the performance of the heat exchange by letting additional or less refrigerant into the cabin evaporator 113.

The cabin evaporator 113 may be located within the HVAC module 121. The cabin evaporator 113 may include coils (not shown). The cabin evaporator 113 may be configured to cool and dehumidify the air flowing across the coils (not shown) and into the passenger compartment 122. The cabin evaporator 113 may further include a fan (not shown) to direct air over the coils impregnated with refrigerant, and facilitate the direction of the air into the passenger compartment 122. The cabin evaporator 113 may be further configured to direct refrigerant back to the compressor 102.

The coolant loop 169 of the heating circuit 125 may include the coolant cavity 137 of the first condenser 111c and a coolant heater core 112. The coolant cavity 137 of the first condenser 111c may have an inlet 138 and an outlet 139. The warmed coolant flowing through the coolant cavity 137 may be expelled from the coolant outlet 139 and directed through a coolant heater core 112. The coolant heater core 112 may be housed in the HVAC module 121. The coolant heater core 112 may condition and warm the air received by the passenger compartment 122. The coolant heater core 112 may expel coolant back to the first condenser 111c at the coolant cavity inlet 138.

Referring to FIG. 4, a second configuration of the second embodiment of the heat pump system 200 is shown. In the second configuration the heating circuit and cooling circuit remain the same as in FIG. 3, with the exception that the first expansion device 150 is relocated upstream of the first flow control valve 120. Further, the receiver dryer 105 and the vapor-liquid separator 152 are combined into a combination receiver dryer and vapor-liquid separator 170 component capable of both removing moisture from the refrigerant and separating intermediate pressure refrigerant received from the first expansion device 150 into gaseous refrigerant and liquid refrigerant.

Therefore, the first expansion device 150, may allow the high pressure liquid refrigerant to cool and expand, reducing the pressure of the refrigerant as it exits the first expansion device 150. The first expansion device 150 may be further configured to control and selectively distribute intermediate pressure refrigerant to the first flow control valve 120. The intermediate pressure refrigerant may be composed of refrigerant in a liquid state and refrigerant in a gaseous state.

The first flow control valve 120 may be a three-way two-position valve. The first flow control valve 120 may be configured to occupy a first position in heating mode in which the first control valve 120 receives refrigerant from the first condenser 111c and blocks flow from the second condenser 103. The first flow control valve 120 may be configured to occupy a second position in cooling mode in which the first control valve 120 receives refrigerant from the second condenser 103 and blocks flow from the first condenser 111c. The first flow control valve 120 may be further configured to expel refrigerant to the combination receiver dryer and vapor-liquid separator component 170 when occupying one of the first position and second position.

The combination receiver dryer and vapor-liquid separator 170 may have an inlet 151, a first outlet 153, and a second outlet 154. The combination receiver dryer and vapor-liquid separator 170 may be configured to remove moisture from the refrigerant and separate intermediate pressure refrigerant received from the first expansion device 150 into gaseous refrigerant and liquid refrigerant.

The combination receiver dryer and vapor-liquid separator 170 may expel gaseous refrigerant from the first outlet 153 and be further configured to inject gaseous refrigerant though a gas injection line 162 and into the compressor 102 at the second inlet 155.

The combination receiver dryer and vapor-liquid separator component 170 may also expel liquid refrigerant through the second outlet 154. The liquid refrigerant may be selectively distributed from the receiver dryer 105 to one or both of a second expansion device 108 and a third expansion device 107 via a third control valve 106.

As shown in FIGS. 1-4, each of the respective heating circuit 125 and cooling circuit 124 may include at least one control module 123 that may be electrically connected with at least one electrical connection 136 and may be configured to monitor and control the heat pump system 100, 200 in a variety of operating modes. The at least one control module 123 may be configured to communicate with the motor (not shown) which may drive the compressor 102. The at least one control module 123 may further be configured to communicate with the first, second, and third expansion devices 150, 108, 107; the first, second, and third flow control valves 120, 114, 106; and other subsystems through the at least one electrical connection 136.

Figure 5:
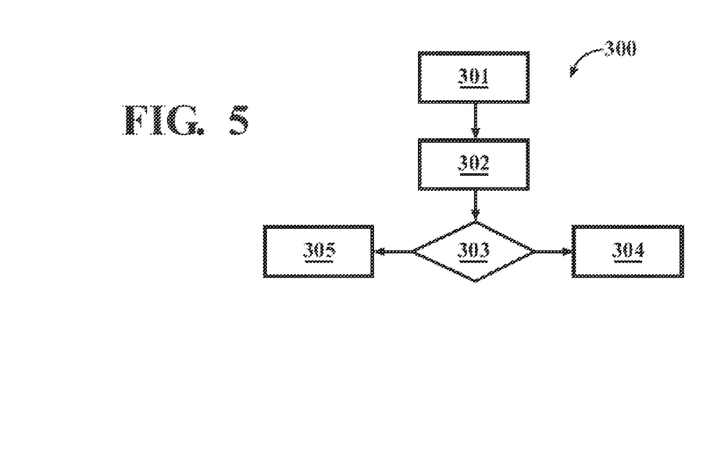
FIG. 5 is a flow diagram detailing the steps necessary to operate a heat pump system utilizing intermediate gas recompression.

Referring to FIG. 5, in conjunction with the structure of the example system 100, 200 shown in FIGS. 1-4, the present method (shown in flow chart form in FIG. 5 at 300) may be beneficially used to operate a heat pump system 100, 200 which utilizes intermediate gas recompression.

At step 301, the first expansion device 150 supplies intermediate pressure refrigerant to a vapor-liquid separator 152.

At step 302, the vapor-liquid separator 152 separates the intermediate pressure refrigerant into gaseous refrigerant to be expelled from the first outlet 153 and liquid refrigerant to be expelled from the second outlet 154 and circulated throughout the remainder of one of the heating circuit 125 and cooling circuit 124.

At step 303, the controller 123 through the at least one electrical connection 136 evaluates the pressure of the refrigerant entering the compressor 102 from the gas injection line 162 at the second inlet 155.

At step 304, if the evaluation of step 303 produces a pressure above a minimum threshold value, which may range from about 0 kPaG to about 150 kPaG, the second flow control vale 114, placed along the gas injection line 162, will remain fully closed. If the evaluation of step 303 produces a pressure below a minimum threshold value, which may range from about 0 kPaG to about 150 kPaG, then the second flow control valve 114 along the gas injection line 162 will maintain a fully open position, thereby allowing the injection of gaseous refrigerant from the vapor-liquid separator 152 into the compressor 102 to increase the mass flow rate of refrigerant flowing through the compressor 102.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A heat pump system for use in a vehicle having a battery and a passenger compartment, the heat pump system comprising:
    a heating circuit configured to circulate a refrigerant in a first operating mode, to heat the passenger compartment and cool the battery, wherein the heating circuit further includes a first condenser, such that the first condenser is a refrigerant-to-coolant condenser having a refrigerant cavity and a coolant cavity;
    a cooling circuit configured to circulate the refrigerant in a second operating mode, to condition air received by the passenger compartment and cool the battery, wherein the cooling circuit further includes a second condenser;
    a coolant loop configured to circulate a coolant therethrough, the coolant loop including the first condenser and a coolant heater core therealong;
    a compressor having a first inlet and a second inlet, wherein the compressor is incorporated into each of the heating circuit and the cooling circuit and configured to receive the refrigerant at each of the first inlet and the second inlet and further configured to compress refrigerant;
    a vapor-liquid separator incorporated in each of the cooling circuit and the heating circuit, wherein the vapor-liquid separator is configured to separate the refrigerant in a gaseous state from the refrigerant in a liquid state and further configured to transmit the refrigerant in the gaseous state to the compressor for injection at the second inlet;
    a first expansion device incorporated in the heating circuit and disposed upstream of the vapor-liquid separator, wherein the first expansion device is configured to receive the refrigerant from the refrigerant cavity of the first condenser;
    a first flow control valve incorporated in each of the heating circuit and the cooling circuit, wherein the first flow control valve is configured to receive the refrigerant from one of the first expansion device and the second condenser and further configured to transmit the refrigerant to the vapor-liquid separator;

a second flow control valve incorporated in each of the heating circuit and the cooling circuit, wherein the second flow control valve is configured to receive the refrigerant, in the gaseous state, from the vapor-liquid separator and transmit the refrigerant to the compressor at the second inlet, wherein the second flow control valve meters the flow of gaseous refrigerant between the vapor-liquid separator and the compressor;

a controller in communication with at least the compressor, the first flow control valve, and the second flow control valve, the controller having a processor and tangible, non-transitory memory on which is recorded instructions, wherein executing the recorded instructions causes the processor to:

evaluate an instantaneous pressure of the refrigerant flowing through the compressor;

compare the instantaneous pressure of the refrigerant to a minimum threshold pressure value written on the tangible, non-transitory memory of the controller; and actuate the second flow control valve to an open position when the instantaneous pressure of the refrigerant is below the minimum threshold pressure value, such that the refrigerant from the vapor-liquid separator is injected into the compressor at the second inlet, wherein an injection of the refrigerant into the compressor at the second inlet increases the mass flow rate of the refrigerant entering the compressor.

2. The heat pump system of claim 1 wherein the first condenser is configured to receive the refrigerant from the compressor at the refrigerant cavity and further configured to receive the coolant from the coolant heater core at the coolant cavity, such that the refrigerant flowing through the refrigerant cavity is in heat exchange relation with the coolant flowing through the coolant cavity.

3. The heat pump system of claim 1 wherein the vapor-liquid separator is a combination receiver dryer and vapor-liquid separator.

4. The heat pump system of claim 3 wherein the heating circuit further comprises:

the first expansion device, which is configured to receive the refrigerant from the refrigerant cavity of the first condenser;

the first flow control valve, which is configured to receive the refrigerant from the refrigerant cavity of the first condenser via the first expansion device and transmit the refrigerant to the vapor-liquid separator;

the vapor-liquid separator, which is configured to receive the refrigerant from the first flow control valve and further configured to separate the refrigerant in the gaseous state from the refrigerant in the liquid state and to remove moisture from the refrigerant; and wherein the vapor-liquid separator is configured to expel the refrigerant in the liquid state through the heating circuit and expel the refrigerant in the gaseous state to the compressor at the second inlet via the second flow control valve.

5. The heat pump system of claim 4 wherein the heating circuit further includes:

a second expansion device configured to receive the refrigerant from the vapor-liquid separator;

an RESS chiller configured to act as a heat pump evaporator in heat exchange relation with air surrounding the battery and the refrigerant flowing through the RESS chiller, the RESS chiller further configured to receive the refrigerant from the second expansion device and expel the refrigerant to the compressor at the first inlet;

a third expansion device configured to receive the refrigerant from the vapor-liquid separator; and a cabin evaporator configured to receive the refrigerant from the third expansion device and expel the refrigerant to the compressor, wherein the cabin evaporator is in heat exchange relation with the refrigerant flowing through the cabin evaporator and air received by the passenger compartment.

6. The heat pump system of claim 3 wherein the cooling circuit further includes:

the compressor, which is configured to receive the refrigerant at the first inlet and the second inlet and further configured to compress the refrigerant;

the second condenser configured to receive the refrigerant from the compressor and further configured to condition air received by the passenger compartment;

the first flow control valve, which is configured to receive refrigerant from the second condenser and transmit refrigerant to the vapor-liquid separator; and wherein the vapor-liquid separator is configured to expel liquid refrigerant through the cooling circuit and transmit gaseous refrigerant to the compressor via the second inlet.

7. The heat pump system of claim 6 wherein the cooling circuit further includes:

a second expansion device configured to receive refrigerant from the vapor-liquid separator;

an RESS chiller configured to act as a heat pump evaporator in heat exchange relation with the air surrounding the battery and refrigerant flowing through the RESS chiller, the RESS chiller further configured to receive the refrigerant from the second expansion device and expel the refrigerant to the compressor at the first inlet, a third expansion device configured to receive the refrigerant from the vapor-liquid separator; and a cabin evaporator, which is configured to receive the refrigerant from the third expansion device and expel the refrigerant to the compressor, wherein the cabin evaporator is in heat exchange relation with the refrigerant flowing through the cabin evaporator and air received by the passenger compartment.

8. The heat pump system of claim 1
wherein the coolant heater core is in heat exchange relation with the coolant flowing through the coolant heater core and air flowing across the coolant heater core and into the passenger compartment, the coolant heater core further configured to receive the coolant from the coolant cavity of the first condenser.

9. The heat pump system of claim 8 wherein the coolant circulating within the coolant loop is directed from the coolant cavity of the first condenser to the coolant heater core and back to the coolant cavity of the first condenser.

10. A method of operating a heat pump system comprising the steps of:

providing a heat pump system including:

a heating circuit configured to circulate a refrigerant in a first operating mode, to heat the passenger compartment and cool a battery, wherein the heating circuit further includes a first condenser, such that the first condenser is a refrigerant-to-coolant condenser having a refrigerant cavity and a coolant cavity;

a cooling circuit configured to circulate the refrigerant in a second operating mode, to condition air received by the passenger compartment and cool the battery, wherein the cooling circuit further includes a second condenser;

a coolant loop configured to circulate a coolant therethrough, the coolant loop including the first condenser and a coolant heater core therealong;

a compressor having a first inlet and a second inlet, wherein the compressor is incorporated into each of the heating circuit and the cooling circuit and configured to receive the refrigerant at each of the first inlet and second inlet and further configured to compress refrigerant;

a vapor-liquid separator incorporated in each of the cooling circuit and the heating circuit, wherein the vapor-liquid separator is configured to separate the refrigerant in a gaseous state from the refrigerant in a liquid state and further configured to transmit the refrigerant in the gaseous state to the compressor for injection at the second inlet;

a first expansion device incorporated in the heating circuit and disposed upstream of the vapor-liquid separator, wherein the first expansion device is configured to receive the refrigerant from the refrigerant cavity of the first condenser;

a first flow control valve incorporated in each of the heating circuit and the cooling circuit, wherein the first flow control valve is configured to receive the refrigerant from one of the first expansion device and the second condenser and further configured to transmit the refrigerant to the vapor-liquid separator;

a second flow control valve incorporated in each of the heating circuit and the cooling circuit, wherein the second flow control valve is configured to receive the refrigerant, in the gaseous state, from the vapor-liquid separator and transmit the refrigerant to the compressor at the second inlet, wherein the second flow control valve meters the flow of the refrigerant between the vapor-liquid separator and the compressor; and a controller in communication with at least the compressor, the first flow control valve, and the second flow control valve, the controller having a processor and tangible, non-transitory memory on which is recorded instructions;

supplying intermediate pressure refrigerant to the vapor-liquid separator with one of the first flow control valve and the first expansion device;

separating the intermediate pressure refrigerant into the refrigerant in the gaseous state and the refrigerant in the liquid state with the vapor-liquid separator;

evaluating an instantaneous pressure of the refrigerant entering the compressor with the controller;

comparing, with the controller, the instantaneous pressure of the refrigerant to a minimum threshold pressure value written on the tangible, non-transitory memory of the controller;

actuating the second flow control valve to an open position when the instantaneous pressure of the refrigerant is below the minimum threshold pressure value; and injecting gaseous refrigerant from the vapor-liquid separator into the compressor at the second inlet, via the second flow control valve, to increase the mass flow rate of refrigerant entering the compressor when the refrigerant pressure entering the compressor reaches a minimum threshold value.

11. The method of claim 10 wherein the minimum threshold value ranges from about 0 kPaG to about 150 kPaG.

12. The heat pump system of claim 1 wherein the minimum threshold pressure value ranges from about 0 kPaG to about 150 kPaG.

* * * * *